United States Patent
Bardinet et al.

(10) Patent No.: US 10,274,960 B2
(45) Date of Patent: Apr. 30, 2019

(54) AUTOMATIC GUIDED VEHICLE

(71) Applicant: BALYO, Moissy-Cramayel (FR)

(72) Inventors: Fabien Bardinet, Issy les Moulineaux (FR); Pierre Bureau, Levallois (FR)

(73) Assignee: BALYO, Moissy-Cramayel (FR)

(*) Notice: Subject to any disclaimer, the term of this patent is extended or adjusted under 35 U.S.C. 154(b) by 0 days.

(21) Appl. No.: 15/457,399

(22) Filed: Mar. 13, 2017

(65) Prior Publication Data
US 2017/0269598 A1 Sep. 21, 2017

(30) Foreign Application Priority Data
Mar. 18, 2016 (EP) .................................... 16161061

(51) Int. Cl.
| | | |
|---|---|---|
| G05D 1/02 | (2006.01) | |
| B66F 9/075 | (2006.01) | |
| B60T 7/22 | (2006.01) | |
| B66F 9/20 | (2006.01) | |
| B66F 17/00 | (2006.01) | |

(52) U.S. Cl.
CPC .............. *G05D 1/0212* (2013.01); *B60T 7/22* (2013.01); *B66F 9/0755* (2013.01); *B66F 9/20* (2013.01); *B66F 17/003* (2013.01); *G05D 1/0248* (2013.01); *G05D 1/0274* (2013.01); *B60T 2201/022* (2013.01); *G05D 2201/0216* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0104800 A1* | 5/2006 | Armbruster | ........... | B66F 9/0755 414/807 |
| 2017/0212517 A1* | 7/2017 | Houle | ................ | B66F 9/0755 |

FOREIGN PATENT DOCUMENTS

| | | | |
|---|---|---|---|
| AU | 2010201626 A1 | 11/2010 | |
| DE | 4234375 A1 | 4/1994 | |
| WO | WO-2012/169903 A2 | 12/2012 | |
| WO | WO-2012169903 A2 * | 12/2012 | ............. G01C 21/00 |

OTHER PUBLICATIONS

Search Report for related European Application No. EP16161061; report dated Sep. 19, 2016.

* cited by examiner

*Primary Examiner* — Thomas G Black
*Assistant Examiner* — Ana D Thomas
(74) *Attorney, Agent, or Firm* — Miller, Matthias & Hull LLP

(57) ABSTRACT

An automatic guided vehicle comprising a fork carriage with a fork, a propulsion drive system, a sensor to acquire position data of objects located in a detection field and a computer. The vehicle comprises a reference member located in the detection field of the sensor rigidly secured to a common rigid frame with the sensor. The sensor periodically acquires control position data indicative of a position of the reference member. The computer periodically compares the control position data with a reference value stored in a memory.

15 Claims, 2 Drawing Sheets

AUTOMATIC GUIDED VEHICLE

CROSS-REFERENCE TO RELATED APPLICATION

This application claims priority under 35 U.S.C. § 119 and the Paris Convention to European Patent Application No. 16161061.3 filed on Mar. 18, 2016.

FIELD OF THE DISCLOSURE

The instant invention relates to automatic guided vehicles and method for operating automatic guided vehicles.

BACKGROUND OF THE DISCLOSURE

Automated guided vehicle are used in a growing number of warehouses, factories and stores for automating objects handling tasks. Automated guided vehicle allows for increasing productivity and improving logistic management.

Examples of such automatic guided vehicle are automatic guided vehicles comprising a fork carriage with load bearing forks, also known as "forklift automated guided vehicles" or "automated forklifts".

WO2012169903 describes an example of such automatic guided vehicle comprising
- a fork carriage with at least one load bearing fork,
- a propulsion drive system to propel the vehicle,
- a sensor to acquire position data of objects located in a detection field of the sensor, and
- a computer receiving position data from the sensor and controlling the propulsion drive system to automatically guide the vehicle.

In environments such as warehouses, factories or stores, human intervention is usually required in addition to automatic operations, for instance to survey tasks or to perform additional tasks that cannot be completed by machines alone. The environments must thus be shared between human and automatic machines.

Safety for the human work force is fundamental n such shared environments and impose stringent requirements to the automatic guided vehicles.

Automatic guided vehicles must for instance be certified according to safety norms (e.g. NF EN ISO 13849-1) to be allowed to perform certain tasks in such a shared environment.

Such a certification process involves analysing the entire control chain of the vehicle, from the sensors to the propulsion drive system, in order to guaranty a low probability of incidents during the operation of the vehicle.

Sensors, in particular, are an essential part of the control chain and it is of utmost important to be able to guaranty, within known limits, that the sensors are functioning correctly or that defects in the sensors operation are identified in a short period of time.

Sensors having high safety properties are known, for instance sensors certified as having a "PLD" level of safety according to norm NF EN ISO 13849-1.

However, inherent design constraints, related in part to the implementation of safety modules in these sensors, restrict the minimal size of such sensors.

These sensors can thus only be mounted in limited locations on the vehicle.

In particular, such certified sensors cannot be easily integrated on the rear of automated forklift and in particular on the load bearing forks since there typical vertical dimension are bigger the side opening in pallets.

A consequence of this situation is that the authorized movements of automatic guided vehicle are usually limited in the rear direction (direction of the load bearing forks) to guarantee the safety of the human beings around the vehicle.

The instant invention has notably for object to mitigate those drawbacks.

SUMMARY OF THE DISCLOSURE

To this aim, according to the invention, such an automatic guided vehicle is characterized in that it further comprises at least one reference member located in the detection field of the sensor, the at least one reference member and the sensor being rigidly secured to a common rigid frame, in that the sensor is operative to at least periodically acquire control position data indicative of a position of the at least one reference member in the detection field of the sensor, and in that the computer is operative to at least periodically compare said control position data with a reference value stored in a memory of the computer.

In some embodiments, one might also use one or more of the following features:
- the sensor is mounted on the fork carriage, in particular on the at least one fork;
- the at least one reference member is mounted on the fork carriage, in particular on the at least one fork;
- the at least one reference member is integral with and formed as part of said at least one fork;
- the common frame comprises said fork carriage or said at least one fork;
- at least the fork carriage, the propulsion system, the sensor and the computer are mounted on a truck frame of the vehicle extending substantially along a horizontal plane,
  said truck frame extends substantially along a longitudinal axis of said horizontal plane between a front end and a rear end, said front end and rear end defining a front direction and a rear direction of the vehicle along the longitudinal axis,
  the fork carriage is mounted at the rear end of the truck frame;
- the sensor is mounted on the vehicle with the detection field of the sensor extending substantially in the rear direction of the vehicle along the longitudinal axis of the vehicle;
- the at least one load bearing fork extends along the longitudinal axis between a front end of the fork and a rear end of the fork, the fork being mounted on the fork carriage at the front end of the fork,
  and the sensor is mounted in close proximity to the rear end of the fork;
- the sensor is housed in a casing and a vertical dimension of said casing, along a vertical axis perpendicular to the horizontal plane, is less than 100 millimeters;
- a total vertical extension of a sensing module comprising the sensor, the common frame and the at least one reference member, is less than 100 millimeters along a vertical axis, in particular a vertical axis perpendicular to an horizontal plane of extension of the vehicle;
- a minimum distance separating the sensor from the at least one reference member is greater than 200 mm;
- the sensor is a range camera, in particular comprises a sensor chosen among the list constituted of a laser sensor, a LIDAR, a stereo camera, a 3D scanner and a time-of-flight camera.

Another object of the invention is a method for operating an automatic guided vehicle as detailed above, wherein the sensor at least periodically acquire control position data indicative of a position of the at least one reference member, and wherein the computer at least periodically compare said control position data with a reference value stored in a memory of the computer.

In some embodiments, one might also use one or more of the following features:
- the reference value stored in the memory of the computer is not updated during the operation of the automatic guided vehicle;
- if the computer determines that the control position data differs from the reference value, the computer stops the operation of the automatic guided vehicle.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION OF THE DISCLOSURE

Figure 1:
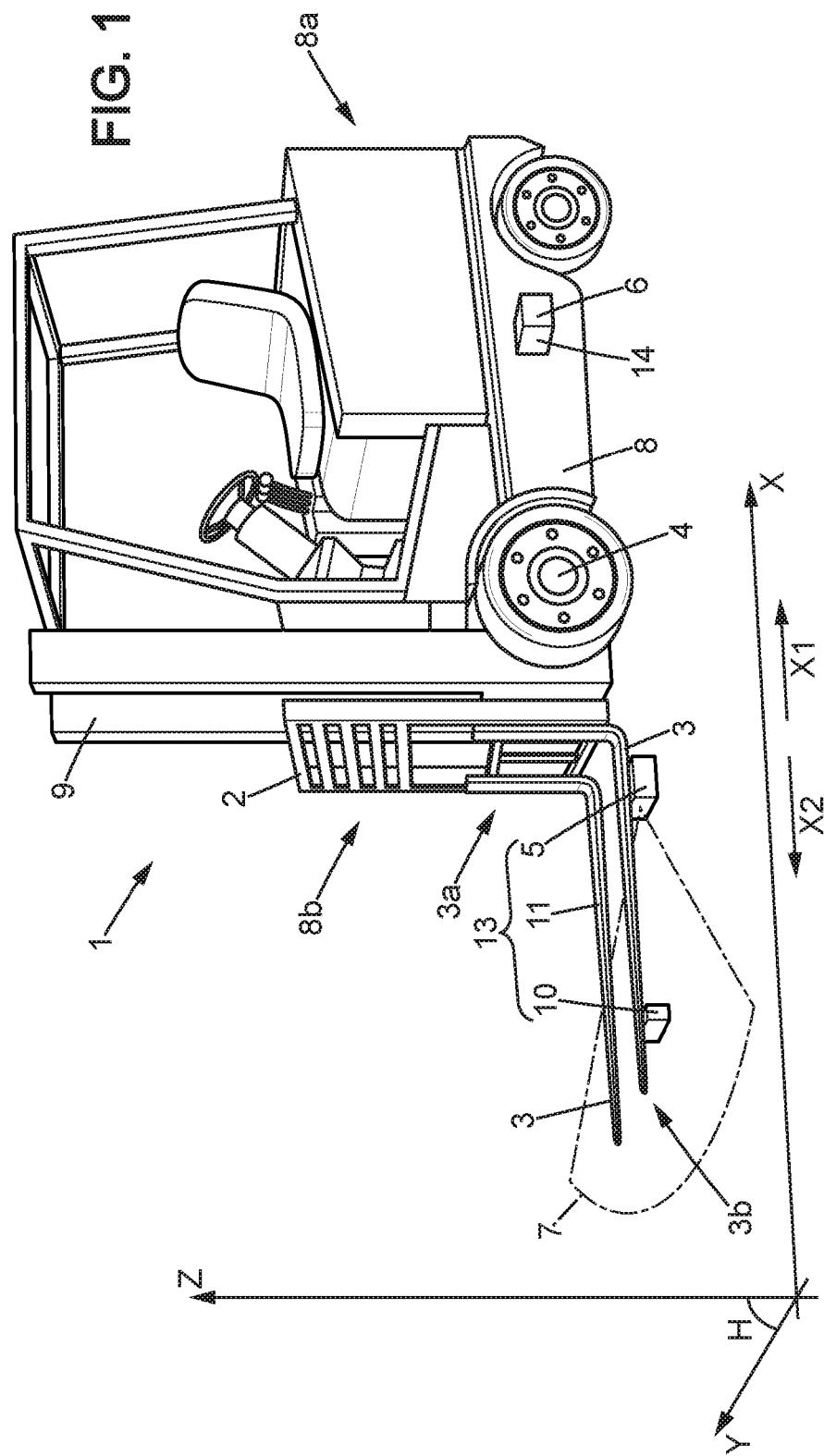
FIG. 1 is a schematic view in perspective of an automatic guided vehicle according to an embodiment of the invention.
Figure 2:
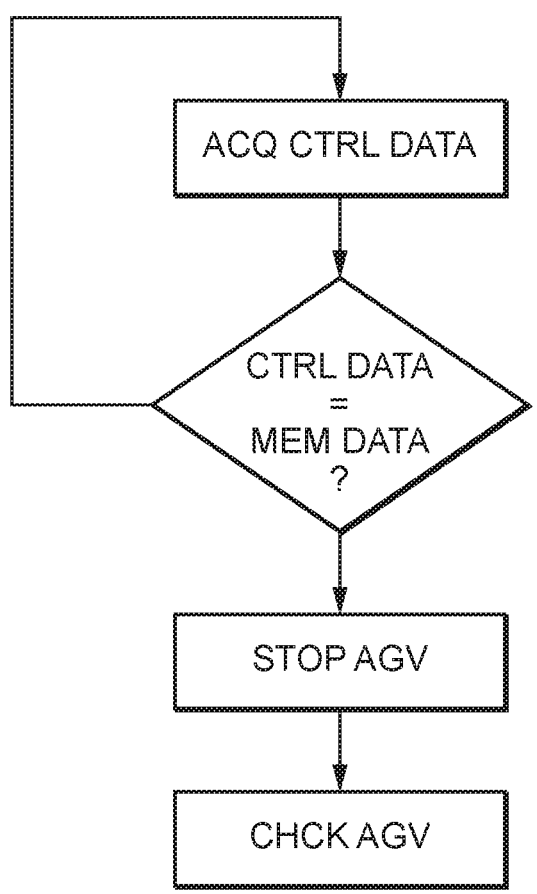
FIG. 2 is a flowchart detailing a method for operating an automatic guided vehicle according to an embodiment of the invention.

FIG. 1 illustrates an embodiment of an automatic guided vehicle 1 according to the invention. This vehicle comprises a fork carriage 2 with at least one load bearing fork 3 and a propulsion drive system 4 to propel the vehicle.

The fork 3 can be rigidly secured to the fork carriage 2. The fork 3 may also be removed from the fork carriage 2 for changing or repairing said forks 3.

The vehicle 1 further comprises at least one sensor 5 and a computer 6.

The sensor 5 is able to acquire position data of objects located in a detection field 7 of the sensor.

The sensor 5 can for instance be a range camera. Sensor 5 may be a laser sensor, a LIDAR, a stereo camera, a 3D scanner or a time-of-flight camera.

The computer 6 receives position data from the sensor 5 and controls the propulsion drive system 4 to automatically guide the vehicle 1.

In the example of FIG. 1, the vehicle 1 comprises a truck frame 8. The fork carriage 2, the propulsion system 4, the sensor 5 and the computer 6 are mounted on the truck frame 8.

The truck frame 8 extends substantially along a horizontal plane H. More precisely, the truck frame 8 extends substantially along a longitudinal axis X of said horizontal plane H, between a front end 8a and a rear end 8b.

A transversal axis Y may also be defined as an axis of the horizontal plane H perpendicular to the longitudinal axis X. A vertical axis Z can also be defined as an axis perpendicular to the horizontal plane H.

Front end 8a and rear end 8b of the truck frame 8 define a front direction X1 and a rear direction X2 of the vehicle 1 along the longitudinal axis X.

For instance, the front direction X1 is defined as a direction of the longitudinal axis X oriented from the rear end 8b to the front end 8a of the truck frame 8. The rear direction X2 may then be defined as a direction of the longitudinal axis X oriented from the front end 8a to the rear end 8b of the truck frame 8.

In one embodiment of vehicle 1, the fork carriage 2 is mounted at the rear end 8b of the truck frame 8. The fork may then be oriented in the rear direction X2 of the vehicle 2.

The fork 3 may for instant extends along the longitudinal axis X between a front end 3a and a rear end 3b. The fork 3 may in particular be mounted on the fork carriage 2 at the front end 3a of the fork 3.

In one embodiment of the invention, the fork carriage 2 may be secured to the truck frame 8 by means of a mast 9 extending along the vertical axis V.

The mast 9 is mounted on the truck frame 8 and may be rigidly secured to the truck frame 8 or may be controlled to pivot around the transversal axis Y for instance.

The fork carriage 2 is mounted on the mast 9 in order to be able to slide along the mast 9 in the vertical direction Z, in a controlled manner.

In one particular embodiment of the invention, illustrated on FIG. 1, the sensor 5 is mounted on the vehicle 1 with the detection field 7 of the sensor 5 extending substantially in the rear direction X2 of the vehicle 1 along the longitudinal axis X.

To this aim, the sensor 5 may for instance be mounted on the fork carriage 2.

In particular, the sensor 5 may be secured to the at least one fork 3, in particular in close proximity to the rear end 3b of the fork 3.

The vehicle 1 further comprises at least one reference member 10.

The reference member 10 is a structural part of the vehicle 1 that is detectable by the sensor 5.

The reference member 10 can for instance be a rigid and opaque target able to reflect a laser light emitted by the sensor 5.

The reference member 10 is located in the detection field 7 of the sensor 5.

The reference member 10 and the sensor 5 are rigidly secured to a common rigid frame 11 of the vehicle 1. This way, the reference member 10 and the sensor 5 are located in fixed position with regard to each other.

In one embodiment, the reference member 10 may be mounted on the fork carriage 2, for instance on a load bearing fork 3. In particular, the reference member 10 may be mounted at a rear end 3b of said fork 3.

According to one example of the invention, the reference member 10 may be integral with and formed as part of the fork 3. In variant, the reference member 10 may be secured to the fork carriage or to the fork in a fixed manner.

In one embodiment of the invention, the sensor 5 may be housed in a casing 12. A vertical dimension of said casing 12, along the vertical axis Z perpendicular to the horizontal plane H, may in particular be less than 100 millimeters.

This way it is possible to mount the sensor 5 and its casing 12 on a fork 3 and ensure that said fork 3 can penetrates, with the sensor 5 and its casing 12, inside a pallet through the side openings of a pallet, in order to lift said pallet off the floor.

More precisely, a sensing module 13 can be defined as comprising the sensor 5, the common frame 11 and the at least one reference member 10. A total vertical extension of said sensing module 13 can in particular be less than 100 millimeters along a vertical axis Z.

A minimum distance separating the sensor 5 from the at least one reference member 10 can also be greater than 200 mm. This way, a position of the reference member 10 in the detection field 7 of the sensor 5 can be determined with a good accuracy.

The sensor 5 is operative to at least periodically acquire control position data indicative of a position of the at least one reference member 10 in the detection field 7 of the sensor 5.

The computer 6 is operative to at least periodically compare said control position data with a reference value stored in a memory 14 of the computer 6.

In one embodiment, the sensor 5 may scan the entire detection field 7 periodically, with a predefined refreshment rate. The control position data may then be acquired periodically with the same refreshment rate.

In a variant, the sensor 5 may continuously acquire the control position data and the computer 6 may be operative to continuously compare said control position data with said reference value stored in the memory 14.

In another variant, the control position data may be acquired with a control rate lower than the refreshment rate of the sensor 5. The computer 6 may then also be operative to compare said control position data with said reference value with a control rate lower than the refreshment rate of the sensor 5. For instance, the control position data may be acquired and compared with said reference value at the start-up of the vehicle 1, or regularly over the course of the vehicle 1 operation.

The reference value stored in the memory 14 can be for instance recorded in the memory 14 during initialisation of the vehicle, in particular during a calibration step in factory following the assembly or check-up of vehicle 1.

The reference value stored in the memory 14 is not updated during the operation of the automatic guided vehicle. The memory 14 may for instance be a read-only memory.

If the control position data departs from the value stored in the memory 14, it is likely that the sensor 5 is not functioning properly or, more generally, that the vehicle 1 has departed from its nominal state.

In this case, the safety of operation of the vehicle 1 cannot be guaranteed anymore and the vehicle 1 should be stopped for check-up.

Thus, if the computer 6 determines that the control position data differs from the reference value, the computer 6 stops the operation of the automatic guided vehicle 1.

In addition, the computer 6 may transmit a signal to a distant database indicating that a check-up of the vehicle 1 is needed and/or may display a signal on the vehicle indicating that a check-up of the vehicle 1 is needed.

According to the present invention, a simple, not certified, sensor can be employed and safe operation can be guaranteed by designing vehicle itself to fulfil the safety requirements.

Small and simple sensors may thus be used that can be integrated in small spaces of the vehicle, in particular close to the load bearing forks.

Safe operation of the vehicle may thus be allowed in most directions of the vehicle and the vehicle may be allowed to perform a great number of tasks in an environment shared with human beings.

The invention claimed is:

1. An automatic guided vehicle comprising:
   a fork carriage with at least one load bearing fork,
   a propulsion drive system to propel the automatic guided vehicle,
   a sensor to acquire position data of objects located in a detection field of the sensor, and
   a computer receiving position data from the sensor and controlling the propulsion drive system to automatically guide the vehicle,
   wherein the vehicle further comprises at least one reference member which is a structural part of the automatic guided vehicle located in the detection field of the sensor and detectable by the sensor, the at least one reference member and the sensor being rigidly secured to a common rigid frame so that the reference member is in a fixed position relative to the sensor,
   wherein the sensor is operative to at least periodically acquire control position data indicative of a position of the at least one reference member in the detection field of the sensor,
   and wherein the computer is operative to at least periodically compare said control position data with a reference value stored in a memory of the computer.

2. The automatic guided vehicle according to claim 1, wherein the sensor is mounted on the fork carriage, in particular on the at least one fork.

3. The automatic guided vehicle according to claim 1, wherein the at least one reference member is mounted on the fork carriage, in particular on the at least one fork.

4. The automatic guided vehicle according to claim 3, wherein the at least one reference member is integral with and formed as part of said at least one fork.

5. The automatic guided vehicle according to claim 1, wherein the common frame comprises said fork carriage or said at least one fork.

6. The automatic guided vehicle according to claim 1, wherein at least the fork carriage, the propulsion system, the sensor and the computer are mounted on a truck frame of the vehicle extending substantially along a horizontal plane,
   wherein said truck frame extends substantially along a longitudinal axis of said horizontal plane between a front end and a rear end, said front end and rear end defining a front direction and a rear direction of the vehicle along the longitudinal axis,
   wherein the fork carriage is mounted at the rear end of the truck frame.

7. The automatic guided vehicle according to claim 6, wherein the sensor is mounted on the vehicle with the detection field of the sensor extending substantially in the rear direction of the vehicle along the longitudinal axis of the vehicle.

8. The automatic guided vehicle according to claim 6, wherein the at least one load bearing fork extends along the longitudinal axis between a front end of the fork and a rear end of the fork, the fork being mounted on the fork carriage at the front end of the fork,
   and wherein the sensor is mounted in close proximity to the rear end of the fork.

9. The automatic guided vehicle according to anyone of claim 1, wherein the sensor is housed in a casing,
   and wherein a vertical dimension of said casing, along a vertical axis perpendicular to the horizontal plane, is less than 100 mm.

10. The automatic guided vehicle according to claim 1, wherein a total vertical extension of a sensing module comprising the sensor, the common frame and the at least one reference member, is less than 100 mm along a vertical axis, in particular a vertical axis perpendicular to a horizontal plane of extension of the vehicle.

11. The automatic guided vehicle according to claim 1, wherein a minimum distance separating the sensor from the at least one reference member is greater than 200 mm.

12. The automatic guided vehicle according to claim 1, wherein the sensor is a range camera, in particular comprises a sensor chosen among the list constituted of a laser sensor, a LIDAR, a stereo camera, a 3D scanner and a time-of-flight camera.

13. A method including providing an automatic guided vehicle comprising:
- a fork carriage with at least one load bearing fork,
- a propulsion drive system to propel the automatic guided vehicle,
- a sensor to acquire position data of objects located in a detection field of the sensor, and
- a computer receiving position data from the sensor and controlling the propulsion drive system to automatically guide the vehicle,
- wherein the vehicle further comprises at least one reference member which is a structural part of the automatic guided vehicle located in the detection field (7) of the sensor and detectable by the sensor, the at least one reference member and the sensor being rigidly secured to a common rigid frame so that the reference member is in a fixed position relative to the sensor,
- wherein the sensor is operative to at least periodically acquire control position data indicative of a position of the at least one reference member in the detection field of the sensor,
- and wherein the computer is operative to at least periodically compare said control position data with a reference value stored in a memory of the computer, said method including:
    - at step wherein the sensor at least periodically acquires control position data indicative of a position of the at least one reference member,
    - and a step wherein the computer at least periodically compares said control position data with a reference value stored in a memory of the computer.

14. The method according to claim 13, wherein the reference value stored in the memory of the computer is not updated during the operation of the automatic guided vehicle.

15. The method according to claim 13, wherein if the computer determines that the control position data differs from the reference value, the computer stops the operation of the automatic guided vehicle.

* * * * *